United States Patent [19]
Kitagawa et al.

[11] Patent Number: 5,115,268
[45] Date of Patent: May 19, 1992

[54] PHOTOGRAPHIC FILM CASSETTE

[75] Inventors: Kuniharu Kitagawa; Hideaki Kataoka; Tomoyuki Takahashi; Kiichiro Kitagawa, all of Kanagawa, Japan

[73] Assignee: Fuji Photo Film Co., Ltd., Kanagawa, Japan

[21] Appl. No.: 571,966

[22] Filed: Aug. 24, 1990

[30] Foreign Application Priority Data

Aug. 25, 1989 [JP] Japan .................. 1-219433

[51] Int. Cl.⁵ .................. G03B 17/26; G03B 17/36
[52] U.S. Cl. .................. 354/275; 354/217; 354/289.1; 242/71.1
[58] Field of Search .................. 354/212, 215, 217, 218, 354/275, 289.1; 242/71.1, 71.2, 71.7; 352/72, 78 R

[56] References Cited

U.S. PATENT DOCUMENTS

| | | | |
|---|---|---|---|
| 3,807,840 | 4/1974 | Cook et al. | 352/72 |
| 3,894,700 | 7/1975 | Ito et al. | 354/275 |
| 4,138,068 | 2/1979 | Kinoshita | 242/71.1 |
| 4,395,107 | 7/1983 | Luhrig et al. | 242/71.1 |
| 4,403,845 | 9/1983 | Buelens et al. | 354/275 |
| 4,802,633 | 2/1989 | Beery | 354/275 |
| 4,846,418 | 7/1989 | Fairman | 354/275 |
| 4,875,638 | 10/1989 | Harvey | 242/71.1 |
| 4,962,401 | 10/1990 | Takahashi | 354/275 |
| 4,978,985 | 12/1980 | Smart et al. | 354/275 |
| 4,987,437 | 1/1991 | Pagano et al. | 354/275 |

FOREIGN PATENT DOCUMENTS

| | | |
|---|---|---|
| 0003511 | 8/1979 | European Pat. Off. |
| 378170 | 7/1990 | European Pat. Off. |
| 820372 | 9/1951 | Fed. Rep. of Germany |
| 2841608 | 4/1980 | Fed. Rep. of Germany |

*Primary Examiner*—A. A. Mathews
*Attorney, Agent, or Firm*—Sughrue, Mion, Zinn, Macpeak and Seas

[57] ABSTRACT

A photographic film cassette has a spool lock mechanism, which is unlocked by a camera member when the film cassette is loaded in a camera. When the unlocked spool is unwound by a camera mechanism, a leader end of a film roll coiled on the spool is advanced outwardly from the interior of the cassette passing through a film passage mouth. When the spool is wound after the photographic film is exposed, the exposed photographic film is wound on the spool. During this winding operation, the film leader end is retained in the film passage mouth by an arresting hook. When the film in the film cassette is not exposed, an indicator shows an unexposed state, but shows an exposed state after the film in the film cassette has been exposed.

9 Claims, 8 Drawing Sheets

PHOTOGRAPHIC FILM CASSETTE

BACKGROUND OF THE INVENTION

This invention relates to a photographic film cassette, and more particularly to a photographic film cassette in which a leader end of a photographic film strip is advanced outwardly from the interior of the cassette when a spool is unwound.

In single lens reflex (SLR) cameras and in compact cameras, a 135 type photographic film cassette is most commonly used. This 135 type film cassette includes a cylindrical cassette body having a film passage mouth, a spool rotatably supported within this cassette body, and a 35 mm wide photographic film strip roll (hereinafter referred to as the "film") coiled on the spool. A film leader section of the film protrudes from the film passage mouth. The film leader section is pulled out slightly from the cassette because, when a film cassette is loaded in a film supply chamber of a camera, a sprocket, disposed between the film supply chamber and a film take-up chamber and adapted initially to feed the film, is brought into engagement with a perforation formed in the film leader section, so that the film leader section can be sent reliably into the film takeup chamber in accordance with rotation of this sprocket.

Recently, a film cassette has been proposed in which, when a spool is unwound, a film roll coiled on the spool is rotated together with the spool to advance the film leader end of the film roll outwardly from the interior of the cassette, and supply the film to the film take-up chamber. In this film cassette, no initial feeder mechanism, including the sprocket mentioned above, is required. Moreover, since the film leader section is held within the cassette, the cassette has the advantage of being easy to handle.

However, this film cassette has such shortcomings that when the film roll is rotated because of vibration during transportation, the film leader end may protrude accidentally from the film passage mouth, or otherwise may be drawn back fully into the cassette beyond the film passage mouth. When the film leader end protrudes from the cassette, this film cassette has no specific feature. On the other hand, when the film leader end is drawn back into the cassette beyond the film passage mouth, it sometimes happens that the film leader end cannot be advanced, even if the spool is unwound.

When the film cassette is being used, it is loaded in the camera and pulled out from the cassette, one frame at a time, and a picture is taken in each frame. After all the frames have been exposed to take pictures, the spool is wound to coil the exposed film onto the spool. The exposed or used film cassette is removed from the camera and is taken to a photofinishing laboratory. If the spool should, for some reason or other, be unwound before it is submitted to the laboratory, the exposed film would be advanced outside the cassette. Therefore, this conventional film cassette is not safe.

If the film leader end is drawn back fully into the cassette beyond the film passage mouth when the exposed film is wound on the spool, it sometimes happens that the film leader end is not advanced from the cassette even if the spool is unwound when the film is to be processed. In such a case, the cassette must be disassembled in order to remove the film from the cassette. Furthermore, there is another problem in that, when the film roll is wound loosely on the spool, unwinding of the spool is not transmitted smoothly to the film leader section, and reliable advancement of the film is difficult to obtain.

In the film cassette of the type which advances the film by rotating the spool, the film leader section does not protrude from the cassette before or after exposure or use of the film. Therefore, it is practically impossible to tell the difference between a new film cassette (or unused film cassette) and an exposed film cassette (or used film cassette) from the appearance of the film cassette. As a consequence, there is a risk that an exposed film cassette will be reloaded in a camera by mistake.

SUMMARY OF THE INVENTION

In view of the foregoing, it is a main object of the present invention to provide a film cassette in which a film roll is not accidentally rotated.

Another object of the invention is to provide a film cassette, in which a film leader end is not drawn back fully into the cassette.

A further object of the invention is to provide a film cassette, in which a film roll can be prevented from being loosened, and a film leader end can be advanced reliably outwardly from the interior of the cassette.

A still further object of the invention is to provide a film cassette in which an exposed state of a cassette film can be distinguished clearly from an unexposed state thereof.

To achieve the above and other objects and advantages, the present invention transmits rotation of a spool to a film roll when the spool is unwound to advance its leader end outside from a film passage mouth, and locks the spool so that the film roll contained in the cassette is not rotated.

A first preferred embodiment of the present invention retains the film leader end at a nearby region of the film passage mouth. Since the film leader end can be retained to the film passage mouth, the film leader end can be advanced reliably outside the cassette when the spool is unwound. Moreover, by cooperating with a spool lock, the film roll can be prevented from being loosened thus ensuring reliable advancement of the film leader section. In one embodiment, to retain the film leader, an arresting hook disposed in the vicinity of the film passage mouth, retains an opening formed in the vicinity of the film leader end. The opening angle of this arresting hook is set to be 60° C. or less. The arresting hook is provided with an inclined surface formed at a rear surface portion located on a side opposite the film passage mouth, so that the opening can climb over it easily.

Another preferred embodiment of the present invention indicates whether the photographic film is in an exposed state or an unexposed state and changes indication in response to loading of the camera or to sequential operation of the camera.

According to the present invention, since the spool lock is provided, the spool never is rotated accidentally to advance the film, even when the film cassette is not loaded in the camera. Furthermore according to the present invention, since the nearby region of the film leader end is retained, the film leader end is not drawn back fully into the spool. Moreover since the film roll is prevented from being loosened by cooperation between the spool lock and the film leader retainer, the film leader end can be advanced reliably outside the cassette. Also, the present invention exhibits an outstanding effect of preventing the film roll from being loosened during transportation, due to vibration, aging change, etc. Friction between the outermost peripheral surface of the loosened film roll and the inner wall of the cassette is reduced and the outermost peripheral surface can be prevented from being damaged. Furthermore, since there is an indication of whether the film is in an exposed state or an unexposed state, it can be known clearly whether the film is already exposed, and reloading of an exposed film in a camera is prevented.

Since the opening angle of the retaining hook is set to be 60° or less, the film leader end can be retained reliably in the vicinity of the film passage mouth. Furthermore as the rear surface of the retaining hook is formed in an inclined surface the opening of the film leader section retained by the retaining hook is not ruptured and the film surface is not damaged by friction when the film leader end is advanced outwardly. As a consequence, smooth transportation can be obtained.

BRIEF DESCRIPTION OF THE DRAWINGS

The above objects and advantages will become apparent from the detailed description of the invention with reference to the accompanying drawings, wherein:

FIG. 9 is also is a side view showing the unexposed state of the film cassette of FIG. 9A in which the cap is already removed therefrom;

DETAILED DESCRIPTION OF THE PREFERRED EMBODIMENTS

Figure 1:
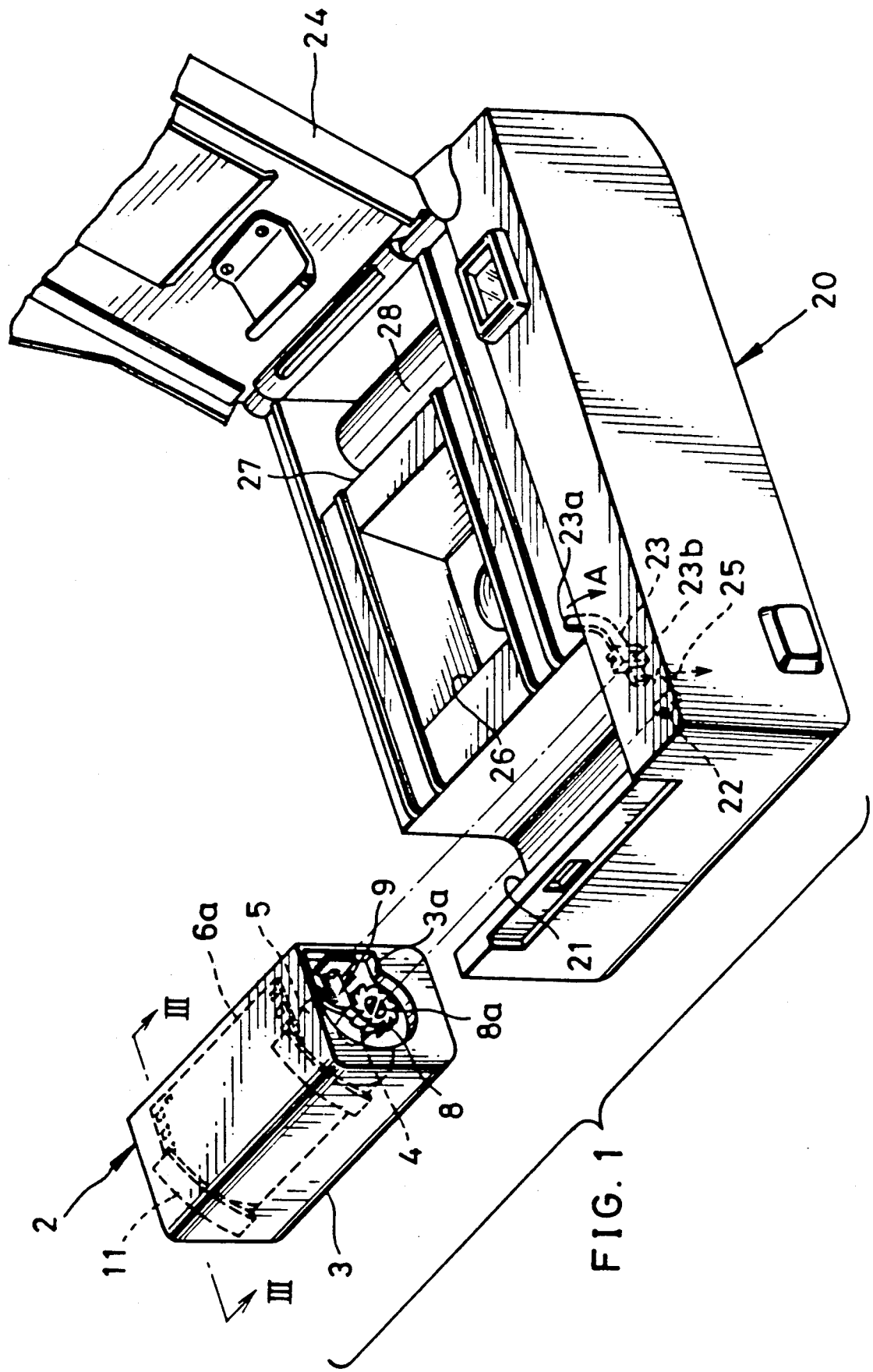
FIG. 1 is a perspective view showing one embodiment of a film cassette of the present invention and a camera in which this film cassette is loaded.

Referring to FIG. 1, the film cassette 2 has a lighttight cassette body 3, a spool 4 rotatably supported therein, and a film roll 5 coiled on this spool 4. This film roll 5 is constituted by a film 6 of, for example, 135 type (35 mm in width) formed in a roll, of which a trailing end is fixed to the spool 4. The cassette body 3 is made of, for example, plastic having a lighttight property, one end of the body 3 being provided with a recess portion 3a containing a ratchet wheel 8. This ratchet wheel 8 is formed integrally with the spool 4 for coiling the film 6 thereon by plastic molding. A pawl 9, engageable with the ratchet wheel 8, is attached pivotably to a bottom surface of the recess portion 3a and is adapted to prevent the spool 4 from being rotated accidentally in the unwinding direction. Actually, the cassette body 3 is split into two sections which are combined integrally after the spool 4 is stored with the film 6 coiled thereon. In this embodiment, the spool 4 can be rotated freely only in the winding direction. However, by using, for example, a combination of a gear having triangular teeth and a pawl having a triangular detent, it may be designed such that the spool 4 is prevented from rotating in both the unwinding and the winding directions. Owing to the foregoing arrangement, the leader end 6a of the film 6 never protrudes from the cassette body 3, or fully draws back into the cassette body 3 because of accidental rotation of the spool 4 during transportation of the film cassette 2, for example.

Figure 2:
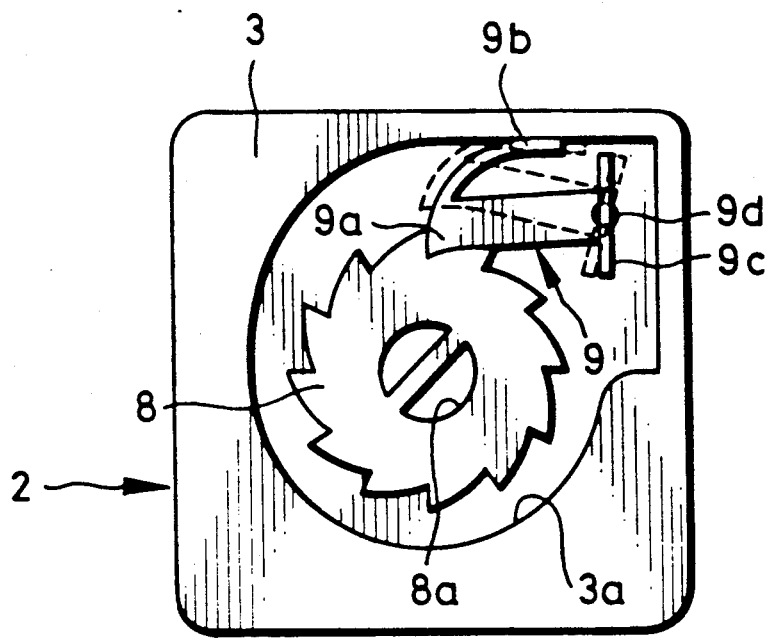
FIG. 2 is a side view of the film cassette shown in FIG. 1.

As shown in detail in FIG. 2, the pawl 9 includes a detent portion 9a engageable with the ratchet wheel 8, an arm portion 9b having a spring property, an engagement release portion 9c, and a shaft portion 9d, all these being formed integrally by plastic molding. The arm portion 9b is adapted to bias the pawl 9 in a counterclockwise direction about the shaft portion 9d so that the detent portion 9a is engaged with the ratchet wheel 8, a free end of the arm portion 9b abutting the inner wall surface of the recess portion 3a. When the engagement release portion 9c is pivoted the pawl 9 is moved as indicated by the dotted lines to disengage the detent portion 9a from the ratchet wheel 8.

Referring again to FIG. 1, a camera 20 includes a film supply chamber 21 for accommodating the film cassette 2 therein. A spool drive shaft 22 and a spool unlocking member 23 are disposed within the chamber 21. The spool drive shaft 22 is engaged in a hole 8a formed in the center of the ratchet wheel 8 to drive/rotate the spool 4. The spool unlocking member 23, when coupled with the engagement release portion 9c of the pawl 9, pivots the pawl 9 to lock or unlock the spool. One end 23a of this spool unlocking member 23 is pushed by the inner side of a back cover 24 when the back cover 24 is closed and the member 23 is pivoted about a shaft 23b in the direction as indicated by an arrow A. On the other hand when the back cover 24 is open, the spool unlocking member 23 is pivoted in a direction opposite to the arrow A by a spring 25, and is returned to the position shown in the drawing. The camera 20 also is provided with a film take-up chamber 27 at a position opposite the film supply chamber 21 with an aperture 26 for defining a picture frame disposed therebetween. A film take-up shaft 28 is disposed at the inner side of the film take-up chamber 27 for taking up the exposed film 6.

Figure 3:
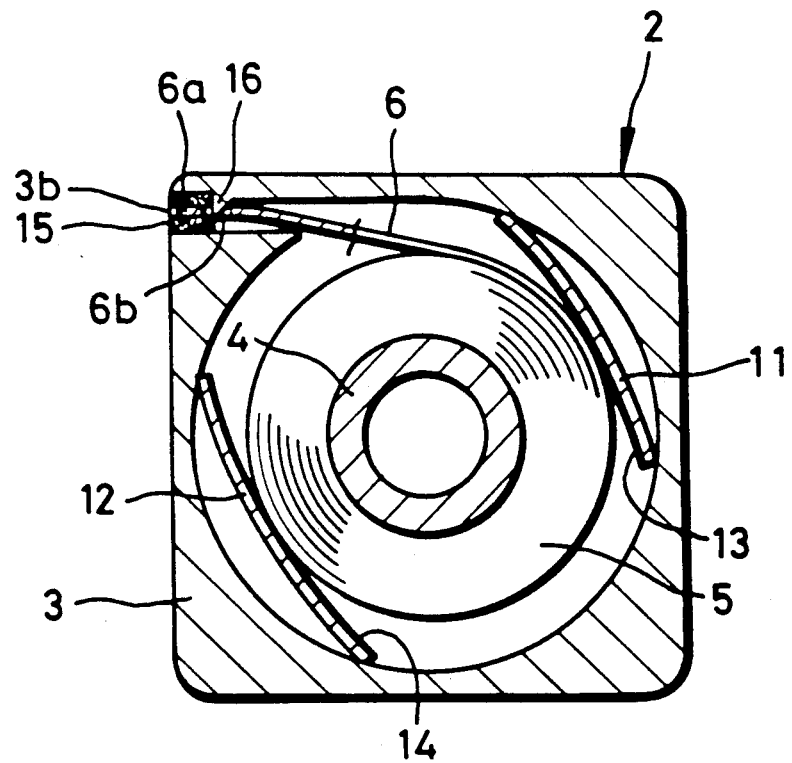
FIG. 3 is a sectional view taken along a line III—III in FIG. 1.

In FIG. 3 showing the internal structure of the film cassette 2, both end portions of the inner wall of the cassette body 3 are provided with resilient plates 11 and 12 for urging the outermost periphery of the film roll 5 toward the axial center of the spool 4 from two directions. Owing to this urging, the film roll 5 is prevented from being loosened. Accordingly, when the spool 4 is rotated in the unwinding direction, the film roll 5 is rotated together with the spool 4 so that the film leader end 6a can be advanced outwardly from the film passage mouth 3b. The resilient plates 11 and 12 are provided with lubricant layers 13 and 14 on respective surfaces thereof contacting the film roll 5. It is noted that the spool 4 may be provided with flanges instead of the resilient plates 11 and 12 so as to clamp the outermost periphery of the film roll 5. It is noted that the spool 4 may be provided with flanges instead of the resilient plates 11 and 12 so as to clamp the outermost periphery of the film roll 5.

The film passage mouth 3b is provided with plush 15 attached thereto to trap light entering into this film passage mouth 3b. This film passage mouth 3b is provided with an arresting projection 16, engageable with an opening 6b formed in the nearby region of the film leader end 6a, to prevent the film leader end 6a from being fully drawn back into the cassette body 3.

Material of the lubricant layers 13 and 14 is selected such that, if the coefficient of friction between the lubricant layers 13 and 14 and the back surface of the film 6 is represented by $\mu1$, and the coefficient of friction between the emulsion layer surface of the film 6 and the back surface thereof by $\mu2$, $\mu1 \leq \mu2$. If $\mu1 \leq \mu2$, , rotating force of the spool 4 in is transmitted reliably to the film leader end 6a of the film roll 5. Accordingly, by rotating the spool 4 in the film unwinding direction after the ratchet mechanism is released, the film leader end 6a can be fed outwardly from the cassette body 3 from the film passage mouth 3b.

Next, the operation of the above embodiment will be described. In the film cassette 2, since the ratchet wheel 8 is engaged by the pawl 9 before the film cassette 2 is loaded in the camera 20, the spool 4 is not rotated in the film unwinding direction. Also, by means of engagement between the arresting projection 16 and the opening 6b, the film leader end 6a is prevented from being drawn back. Owing to the foregoing, the film leader end 6a of the film roll 5 is not loosened by vibration during transportation, etc., and the film leader end 6a is held in the vicinity of the film passage mouth 3b.

When the film cassette 2 is loaded in the film supply chamber 21 of the camera 20, the hole 8a and the spool driving shaft 22 are coupled with each other, and the engagement releasing portion 9c and the spool unlocking member 23 are coupled with each other. When the back cover 24 of the camera 20 is closed, one end 23a of the spool unlocking member 23 is urged by the back cover 24, and the spool unlocking member 23 is pivoted in the direction, as shown by the arrow A, against the spring 25. In this manner, the pawl 9 is rotated about the shaft portion 9d while deforming the arm portion 9b, and the detent portion 9a is disengaged from the teeth of the ratchet wheel 8 to unlock the spool 4.

When the back cover 24 is closed, a known film transporting device is actuated, and the spool driving shaft 22 is rotated by a motor. Rotation of this spool driving shaft 22 is transmitted to the spool 4, and rotates the spool 4 in the unwinding direction. Since this spool 4 rotates the film roll 5 which is tightly coiled thereon together with it, the opening 6b of the film 6 is disengaged from the arresting projection 16 and allows the film leader end 6a to advance outwardly from the film passage mouth 3b. This film leader end 6a then starts to be transported to the aperture 26.

When the film leader end 6a reaches the film takeup chamber 27, it is caught by the film take-up shaft 28 because the film take-up shaft 28 is rotating together with the spool driving shaft 22. After the film leader section has been fully coiled on the film take-up shaft 28, the spool driving shaft 22 is disconnected from the motor to turn freely. Accordingly, thereafter, the film 6 is advanced outwardly by the film take-up shaft 28 from the cassette body 2. Unexposed film 6 is advanced frame by frame, and a picture is taken on each frame.

When pictures have been recorded in all frames, the camera is put into a rewind mode, and the spool driving shaft 22 and the film take-up shaft 28 start to be rotated reversely. Since the spool 4 is rotated in the winding direction by this spool drive shaft 22, the exposed film 6 supplied from the film take-up shaft 28 is taken up by the spool 4. When most of the exposed film 6 is drawn into the cassette body 3, the opening 6b formed in the film leader section is arrested again by the arresting projection 16. When this occurs, the motor is turned off by a load detection circuit because the load on the motor becomes large. In this way, the rewinding mode of the camera 20 is completed.

After rewinding the film, the back cover 24 is opened and the film cassette 2 is removed from the camera 20. When the back cover 24 is open, since the spool unlocking member 23 is pivoted in a direction opposite to the arrow A by the spring 25 the pawl 9 engages the ratchet wheel 8 to lock the spool 4. In this manner, the exposed film 6 is prevented from advancing outwardly from the film passage mouth 3b.

In this way, in case the film leader end 6a does not protrude from the cassette body 3 when it is loaded in the camera 20 even an unfamiliar or beginning user can load the film easily in the camera 20 just like handling a battery or an audio cassette. Also, at processing time, as the exposed film 6 can be advanced simply outside the cassette body 3 by rotating the spool 4 in operation with the engagement release portion 9c, it is no longer required to disassemble or rupture the cassette in order to take out the film 6, as conventionally required.

Although the ratchet wheel and the pawl are disposed outside the cassette body in the above-mentioned embodiments, it is preferable, in view of design to dispose these parts within the cassette body 3.

Figure 4:
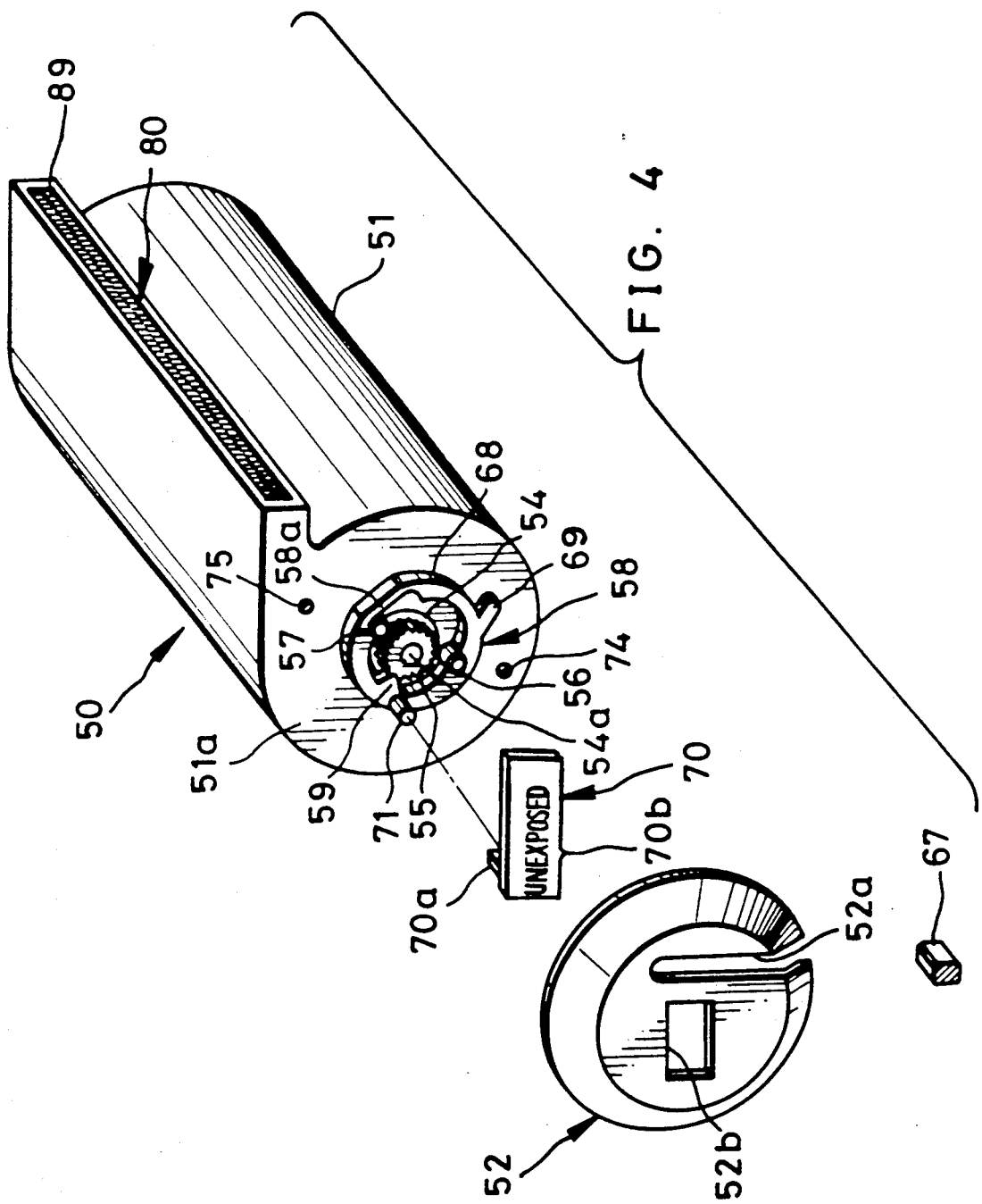
FIG. 4 is a perspective view of a film cassette according to another embodiment of the present invention, in which a cap is removed from a cassette body.

Since the film leader end does not protrude from the interior of the cassette body in the above-mentioned film cassette it is practically impossible to distinguish between an exposed (used) state and an unexposed (unused) state just by looking at the cassette. FIGS. 4 through 12 depict an embodiment which indicates whether the film cassette is in an exposed state or an unexposed state in association with the film loading operation into the camera. FIG. 4 shows a film cassette 50 in which a cap 52 is already removed from one side surface 51a of the cassette body 51. In FIG. 4, the side surface 51a is provided with a shaft end 54a of the spool 54 projecting from its center portion and a gear 55 is fixed thereto. This gear 55 is provided with pins 56 and 57 fixed to an outer side surface 51a thereof. The gear 55 also is provided with a ring 58 which is pivoted about the pin 56.

Figure 9A:
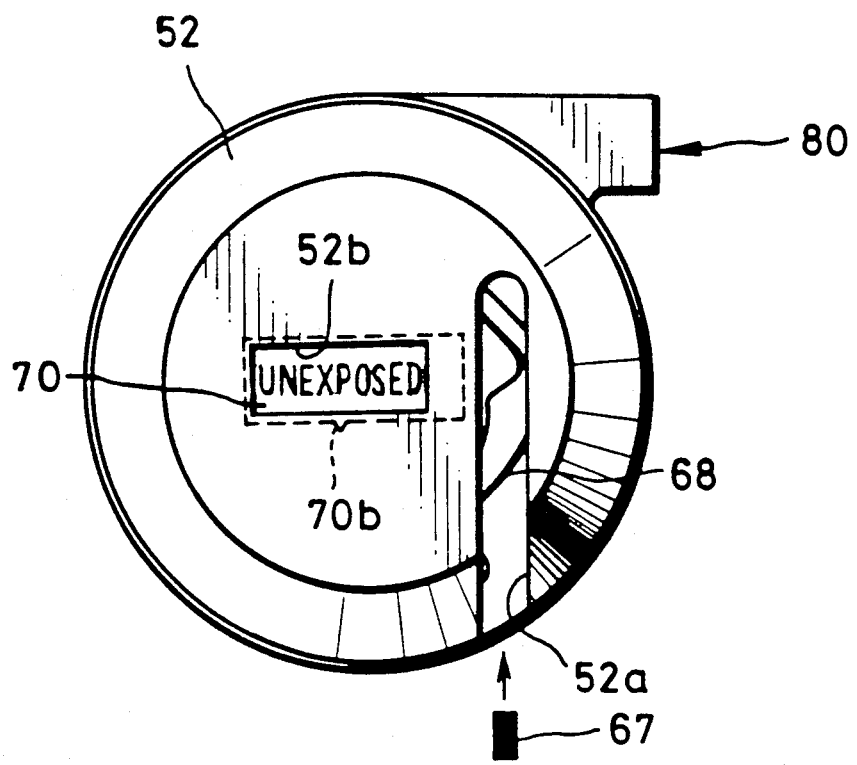
FIG. 9 is a side view showing an unexposed state of the film cassette of FIG. 4.
Figure 9B:
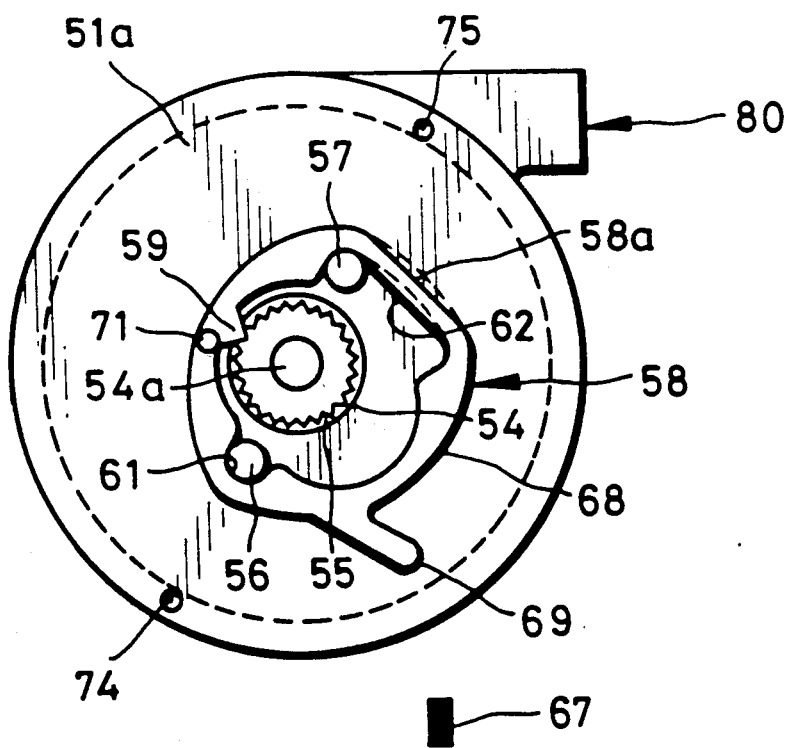
Figure 10A:
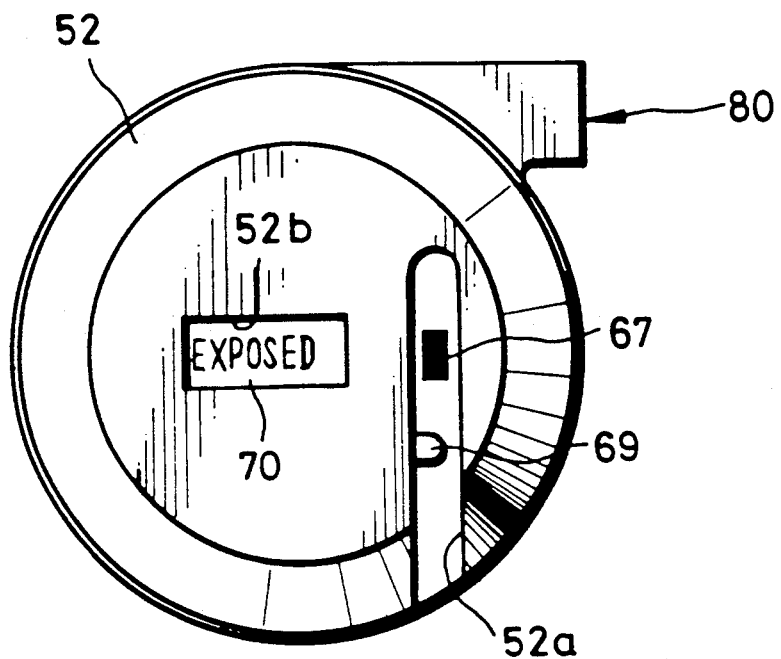
FIG. 10A is a view like FIG. 9A showing a state of the film cassette after exposure.
Figure 10B:
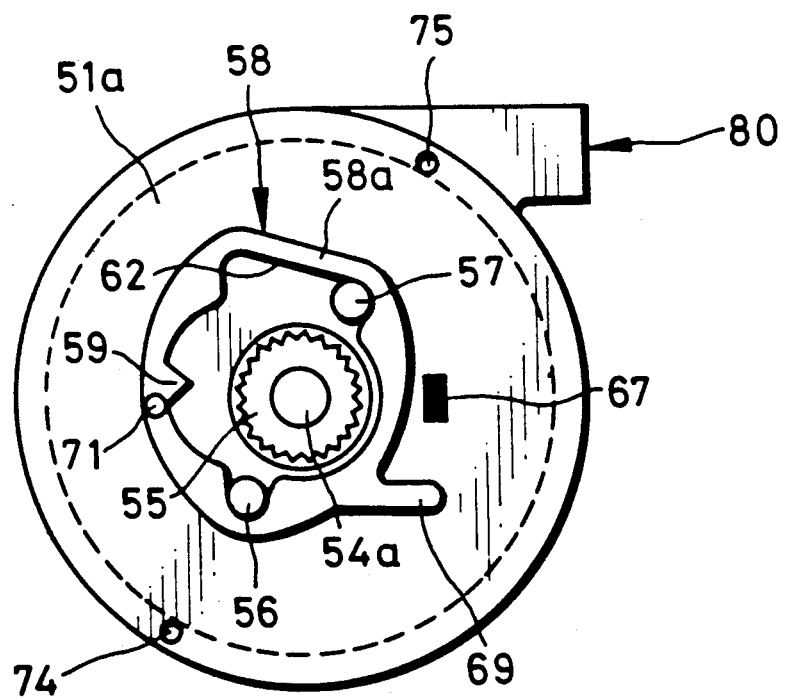
FIG. 10B is a view like FIG. 9B showing a state of the film cassette after exposure

The ring 58 is formed of, for example, plastic having an elastic property. As shown in FIGS. 9B and 10B, the ring 58 is provided with a claw 59 for meshing with the teeth of the gear 55 to retain the spool 54, and a rounded recess portion 61 and an elongated recess portion 62 engageable with the pins 56 and 57, all being formed on the inner circumferential portion of the ring 58. The ring 58 is pivoted about the pin 56 between a first position where the pin 57 abuts one end portion of the elongated recess portion 62 and a second position where the pin 57 abuts the other end portion thereof.

The distance between the pins 56 and 57 is equal to the distance between each end of the rounded recess portion 61 and the elongated recess portion 62, and longer than the distance between the rounded recess portion 61 and an intermediate portion of the elongated recess portion 62. Accordingly, an edge portion 58a forming the elongated recess portion 62 is urged outwardly by the pin 57 when the ring 58 is pivoted and deformed into a curved configuration as shown by two dotted chain lines. In this way, the position of the ring 58 is not stable because of a force for restoring the edge portion 58a to its original configuration during the pivotal movement of the ring 58. Thus, the ring 58 is stopped only at either first or second position.

An outer peripheral portion of the ring 58 is provided with an arcuate portion 68 which is pushed up by a pin 67 fixed to the camera side to pivot the ring 58 counterclockwise when the pin 67 enters the groove 52a formed in the cap 52, and a projecting portion 69 which is pushed down by the pin 67 to pivot the ring 58 clockwise when the pin 67 escapes from the groove 52a.

Figure 5:
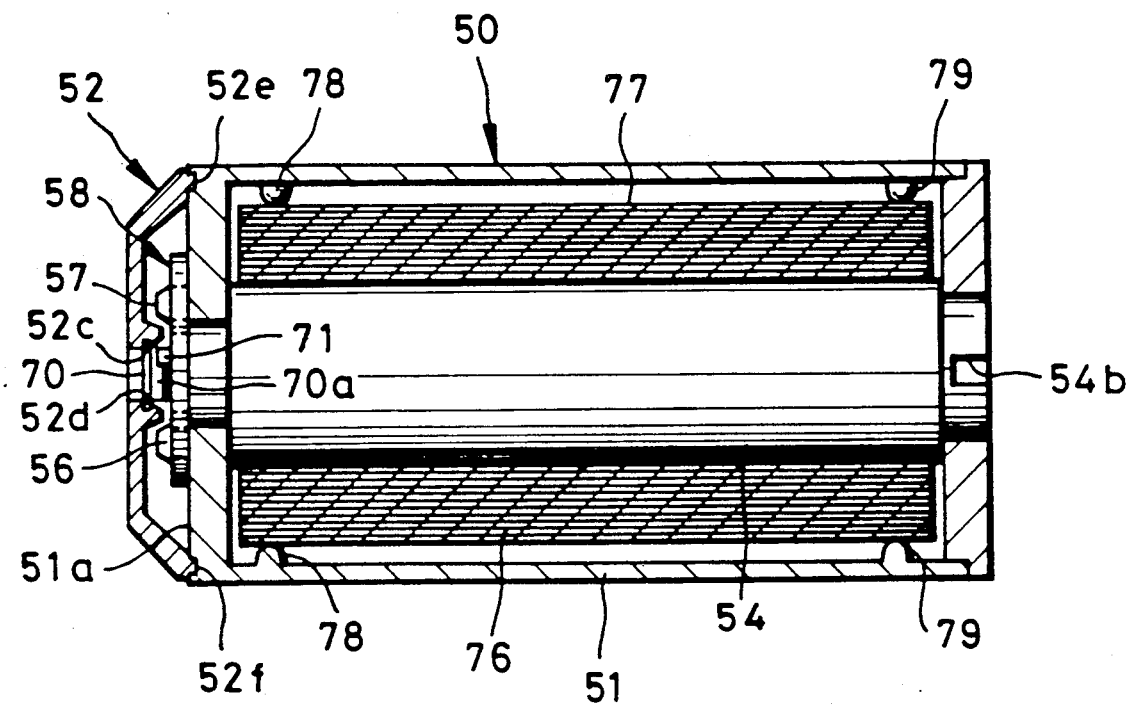
FIG. 5 is a sectional view taken in the axial direction of the film cassette of FIG. 4.

The ring 58 is provided with a pin 71 fixed to a nearby region of a claw 59 on an upper surface of the ring 58 and adapted to engage with a projection 70a to move an indicator panel 70. As shown in FIG. 5, the indicator panel 70 is slidably and loosely engaged in grooves 52c and 52d formed in the inner side of a window 52b of the cap 52. Characters "UNEXPOSED" for example, are printed on the outer surface of the indicator panel 70 so that characters "UNEXPOSED" or "EXPOSED" are indicated in the window 52b depending on stop position of the ring 58. The indicator panel 70 is provided with a projection 70b formed on a lower end portion thereof. The projection 70b is engaged in a recess portion 73 (see FIG. 11) formed in the groove 52d to retain the indicator panel 70 so that the indicator panel 70 will not be returned to its initial position when the indicator panel 70 is moved to a position hiding "UN" to indicate only the characters "EXPOSED".

The cap 52 is fixed to the side surface 51a of the cassette body 51 by projections 52e and 52f, formed on a rear surface of the cap 52, engaged in recess portions 74 and 75 formed in the side surface 51a. In this manner, since the positional relation between the pin 71 and the projection 70a formed on the indicator panel 70 is set correctly, the pin 71 can be engaged reliably with the projection 70.

Figure 6:
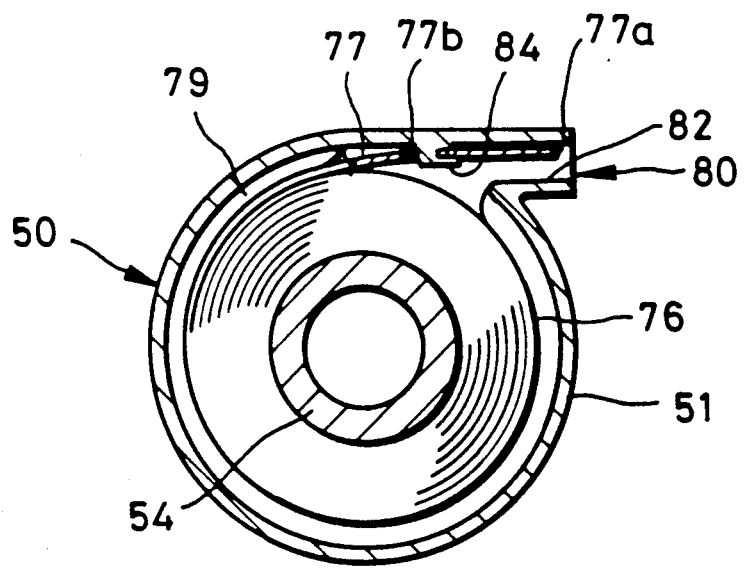
FIG. 6 is a sectional view taken in the lateral direction of the film cassette of FIG. 4.

As shown in FIGS. 5 and 6, the cassette body 51 is provided on its inner peripheral surface with ribs 78 and 79 which function to prevent the roll 76 of the film spool 54 effectively to a film leader end 77a. An upper portion of a film passageway 82 starting from a film passage mouth 80 to the interior of the cassette body 51 is provided with an arresting hook 84 which is engaged with an opening, for example, circular opening 77b formed in the vicinity of the film leader end 77a so as to arrest the film leader end 77a at a nearby region of the film passage mouth 80.

Figure 7:
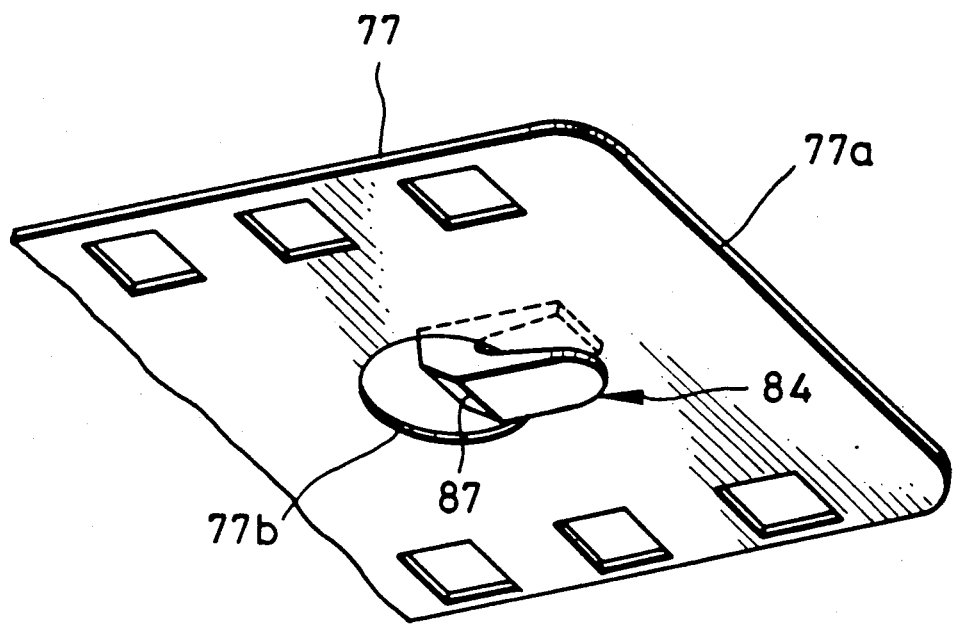
FIG. 7 is a perspective view showing the relation between an arresting hook and an opening formed in a film leader section.
Figure 8:
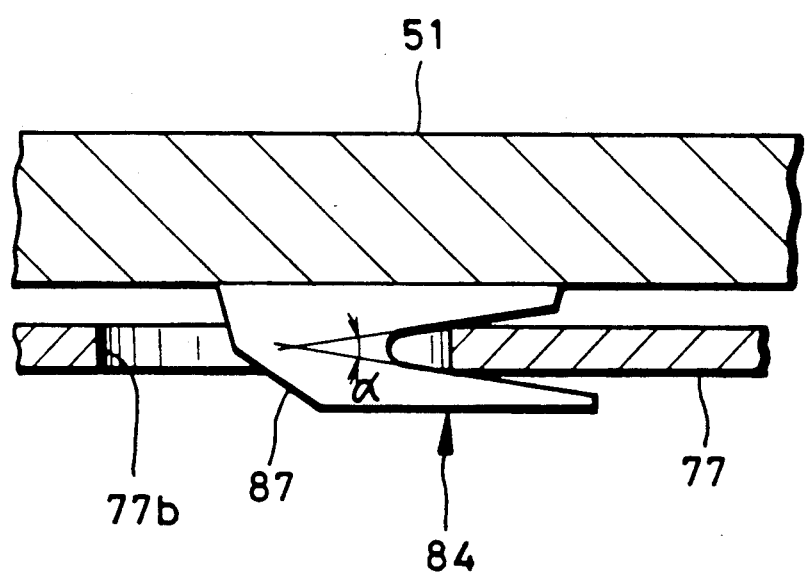
FIG. 8 is an explanatory view showing in its enlarged scale, the arresting hook now retaining the film leader section of FIG. 7.

As shown in FIGS. 7 and 8, the arresting hook 84 is designed such that an opening angle α of the claw 84 is set to be 60° or less, so that the film 77 is prevented from being ruptured at the opening 77b when the arresting hook 84 arrests the opening 77b. Owing to the foregoing arrangement, it becomes possible for the film 77 to bear a tensile force of up to 3.5 kg without being ruptured. A rear surface of the arresting hook 84 is provided with an inclined surface 87 so that the film surface will not suffer from frictional scar when the film 77 is fed. The film passageway 82 is provided with light trapping plush 89 attached to upper and lower wall surfaces thereof in order to prevent external light from entering the cassette body 51 through the film passage mouth 80. In FIG. 6, the plush 89 is omitted in order to avoid complicated illustration in the drawing.

Figure 11:
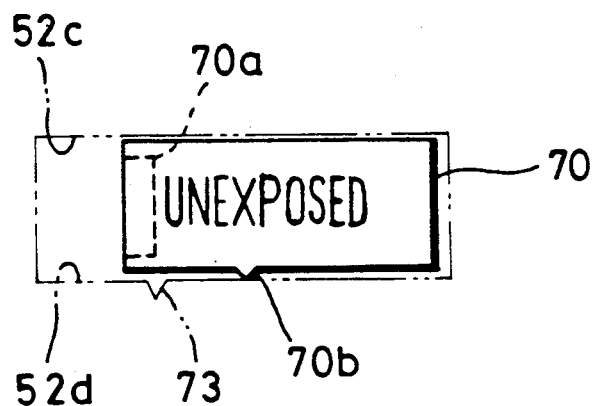
FIG. 11 is a plan view of an indicator panel shown in FIG. 4.
Figure 12A:
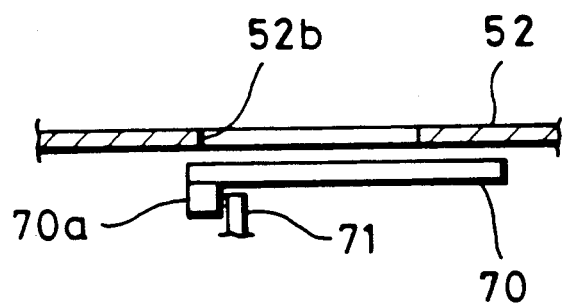
FIG. 12A through 12C are sectional views showing the relation with the indicator panel a window, and a pin for moving the indicator panel.

Operation of the film cassette 50 having the above-mentioned construction now will be described. Before the film cassette 50 is loaded in the camera, the ring 58 is in the first position shown in FIG. 9B, wherein the claw 59 is meshed with the gear 55 to lock the spool 54. At that time, the indicator panel 70 is in a position nearest the groove 52a, and all the characters "UNEXPOSED" appear in the window 52b as shown in FIGS. 9A, 11 and 12A.

Figure 12B:
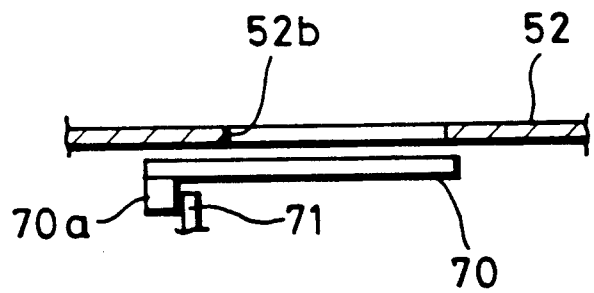
Figure 12C:
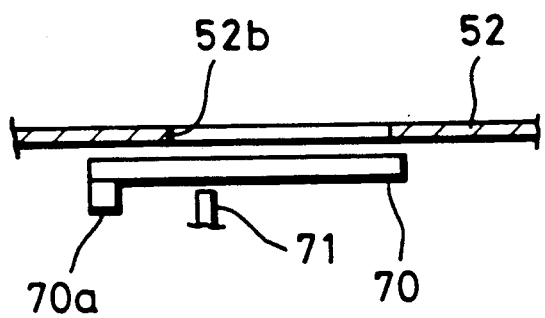

When the film cassette 50 is loaded in the camera the pin 67 enters the groove 52a to push up the arcuate portion 68 of the ring 58. In this manner, the ring 58 is pivoted counterclockwise, and is stopped when the pin 57 abuts the other end portion of the elongated recess portion 62, as shown in FIG. 10B. At the same time, as shown in FIG. 12B, the pin 71 pushes the projection 70a of the indicator panel 70 in order to move the indicator panel 70 away from the groove 52a, so that only the characters "EXPOSED" appear in the window 52b, as shown in FIG. 10A. Since the claw 59 is disengaged from the teeth of the gear 55 at that time, the spool 54 no longer is fixed.

As described in the foregoing when the film has been loaded in the camera, the spool drive shaft disposed on the side of the camera starts actuation for rotating the spool 54 in the unwinding direction. When the film leader end 77a starts movement toward the film passage mouth 80, one end of the opening 77b climbs over the inclined surface 87 of the arresting hook 84 and separates from the arresting hook 84. As a result, the film leader end 77 is allowed to protrude from the film passage mouth 80.

When all pictures have been taken, the spool 54 is rotated in the winding direction. Accordingly, the exposed film 77 is returned into the cassette body 51. When the film leader end 77a has been drawn back into the film passage mouth 80, the opening 77b is caught by the front end of the arresting hook 84.

When the back cover of the camera is open and the film cassette 50 is removed therefrom, the projecting portion 69 of the ring 58 is pushed down by the pin 67, and the ring 58 is pivoted clockwise. As a consequence, the ring 58 is moved from the second position shown in FIG. 10B to the first position shown in FIG. 9B and the claw 59 is meshed with the teeth of the gear 55 to lock the spool 54. At that time, the pin 71 is returned to its initial position. However, the indicator panel 70 is still held engaged with the recess portion 73 of the groove 52d through the projection 70b. accordingly, only the characters "EXPOSED" REMAIN UNCHANGED IN THE WINDOW 52b.

Although the pin 67 on the side of the camera was fixed, the present invention is not so limited. It may be a member responsive to an opening and closing operation of the back cover of the camera or a member driven by camera sequence after the cassette has been loaded. Similarly, although the opening 77b formed in the front end of the film is circular, the present invention of course is not so limited, further, though only one opening is formed as the opening 77b, a plurality of such openings 77b may be provided, together with a corresponding number of arresting hooks 84. The term "loading operation" used in the foregoing description includes an operation for closing the back cover of the camera after the film has been loaded.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A photographic film cassette for use in a camera, said cassette including a spool, a photographic film roll coiled on said spool with a trailing end of a photographic film attached to said spool, and a lighttight cassette body for rotatably supporting said spool, said photographic film cassette further comprising:

film advancement means for advancing a leader end of said photographic film outwardly from the interior of said cassette body in accordance with rotation of said spool when said spool is rotated in a film unwinding direction; and spool lock means for preventing said spool from being rotated, wherein said spool lock means comprises a ratchet wheel fixed to said spool and a pawl having a single detent portion retaining said ratchet wheel, such that said spool is prevented from being rotated in the film in winding direction.

2. A photographic film cassette as claimed in claim 1, further comprising pressing means for pressing an outermost peripheral surface of said film roll to prevent said film roll from being loosened.

3. A photographic film cassette as claimed in claim 2, wherein said pressing means comprises a resilient plate.

4. A photographic film cassette as claimed in claim 2, further comprising retaining means for retaining the leader end of said photographic film in a vicinity of a film passage mouth formed in said cassette body.

5. A photographic film cassette as claimed in claim 4, wherein said film leader retaining means comprises arresting means, disposed in a vicinity of said film passage mouth, for arresting an opening formed in a vicinity of said film leader end.

6. A photographic film cassette as claimed in claim 5, wherein said arresting means comprises a hook, such that an angle formed between a first tangent line drawn to said hook and a second tangent line drawn to a portion contacting said opening is not greater than 60°, and said hook has an inclined surface at a rear surface on an internal side relative to said film passage mouth.

7. A photographic film cassette for use in a camera, said cassette including a spool, a photographic film roll coiled on said spool with a trailing end of a photographic film attached to said spool, and a lighttight cassette body for rotatably supporting said spool, said photographic film cassette further comprising:

film advancement means for advancing a leader end of said photographic film outwardly from the interior of said cassette body in accordance with rotation of said spool when said spool is rotated in a film unwinding direction;

spool lock means for preventing said spool from being rotated; and indicator means for indicating an exposed state and an unexposed state of said photographic film;

wherein said indicator means is associated with said spool lock means, changes form said unexposed state indication to said exposed state indication when said spool lock means unlocks said spool for the first time, and remains in said exposed state indication when said spool lock means returns to its spool locked state.

8. A photographic film cassette including a spool, a photographic film roll coiled on said spool with a trailing end of a photographic film attached to said spool, and a lighttight cassette body for rotatably supporting said spool, said photographic film cassette further comprising:

film advancement means for advancing a leader end of said photographic film outwardly from the interior of said cassette body in accordance with rotation of said spool when said spool is rotated in a film unwinding direction;

spool lock means for preventing said spool from being rotated;

indicator means associated with said spool lock means, said indicator means changes form said unexposed state indication to said exposed state indication when said spool lock means unlocks said spool for the first time, and remains in said exposed state indication when said spool lock means returns to its spool locked state; and indication changing means for changing said indicator means from an unexposed state indication to an exposed state indication by moving said indicator means in response to a film cassette loading operation into a camera or to a camera sequence action.

9. A photographic film cassette as claimed in claim 8, further comprising an arresting hook for engaging an opening formed in a vicinity of a leader end of said photographic film when said photographic film is drawn into said cassette body by rotating said spool in the film winding direction, said arresting hook arresting said film leader end in a vicinity of a film passage mouth formed in said cassette body.

* * * * *